United States Patent [19]

Tarney et al.

[11] B 3,928,664

[45] Dec. 23, 1975

[54] OZONE TREATMENT OF ELASTOMERS

[75] Inventors: Robert Edward Tarney, Hockessin; John Joseph Verbanc, Wilmington, both of Del.

[73] Assignee: E. I. Du Pont de Nemours and Company, Wilmington, Del.

[22] Filed: Jan. 17, 1973

[21] Appl. No.: 324,495

[44] Published under the Trial Voluntary Protest Program on January 28, 1975 as document no. B 324,495.

[52] U.S. Cl. .................................. 427/322; 427/400
[51] Int. Cl.$^2$ .......................................... B05D 3/00
[58] Field of Search . 117/47 A, 138.8 E, 138.8 UA, 117/118; 260/80.78; 427/322

[56] References Cited
UNITED STATES PATENTS 2,715,075  8/1955  Wolinski ............................ 117/47 A
2,897,092  7/1959  Miller ................................ 117/47 A
3,297,626  1/1967  Smith ................................ 260/80.78

OTHER PUBLICATIONS

Copolymer, In Rubber & Chemical Corporation Bulletin.

Primary Examiner—William D. Martin
Assistant Examiner—Janyce A. Bell

[57] ABSTRACT

Contacting surface of sulfur-cured ethylene, propylene, nonconjugated diene elastomer containing carbon black with ozone in concentration of at least 100 parts per million of the atmosphere to condition the surface for painting.

10 Claims, No Drawings

OZONE TREATMENT OF ELASTOMERS

BACKGROUND OF THE INVENTION

This invention relates to a process for modifying the surface of a vulcanized ethylene, propylene, nonconjugated diene elastomer by imparting to the treated surface of the elastomer the property of adherability of paint thereto.

It has been suggested to use vulcanized rubber or other elastomeric materials, e.g., ethylene, propylene, nonconjugated diene copolymers, for certain auto-trim parts, such as bumpers, because rubber can survive low-speed collisions without serious damage much better than steel. However, for many uses in auto-trim accessories, it is necessary to paint the surface of the rubber and the paint must adhere to the rubber surface even under most adverse conditions such as impact and weathering. Further, for the rubber structure, e.g., bumper, to survive a collision without damage, the paint must not only tenaciously adhere to the elastomer but the paint should flex with the elastomeric substrate to which it has been applied. Ethylene, propylene, nonconjugated diene elastomers are strong and well suited for use as auto-trim particularly as bumpers. However, it is known that these elastomers have such poor surface tension that even commonly employed adhesives, no less paint, will not satisfactorily adhere to their surface. Further, it is most difficult to successfully adhere paint to any polyolefin surface.

Polyolefins have been treated with ultraviolet light at high temperatures in the presence of an activator to modify the surface of the structure to make the surface more receptive to painting or increase the bondability of the surface to, for example, a sheet of metal foil, cotton fabric, or ink. Although this procedure has produced polymeric articles in which the material, e.g., ink, adheres to the polymer, the process has several serious drawbacks. For example, when ultraviolet light is used to condition the polymer, an activator, such as benzophenone, must be used in conjunction with the ultraviolet light to obtain satisfactory adhesion of the subsequently applied ink or layer of fabric. Other procedures known in the art for adhering a film of paint or layer of other material to a polyolefin require the application of an intermediate layer or "tie-layer" between the polyolefin and the paint or other material forming the outer surface of the laminated polyolefin. For example, some processes require the application of an organic silicon compound to the surface of the polyolefin either before or after treatment with ultraviolet radiation and prior to the application of a film of paint. Procedures referred to above have the disadvantages of introducing one or more additional steps into the process and, since either activators or "tie-layers" are necessary for satisfactory adhesion, such procedures increase the cost of making the article. Therefore, there exists a need for a process that is economically feasible and insures adequate paint adhesion to the surface of a vulcanized ethylene/propylene/nonconjugated diene elastomer so that the finished structure can withstand weathering and rather severe impact without damage to its surface by separation of the paint from the elastomeric structure.

SUMMARY OF THE INVENTION

It has now been discovered that certain sulfur-cured elastomeric structures can be conditioned to substantially increase the bondability of their surfaces to paint by ozone treatment of said surfaces. More particularly, the present invention involves a process for modifying an elastomeric surface to insure adequate paint adhesion thereto which comprises contacting the surface of a sulfur-cured ethylene, propylene, nonconjugated diene elastomer containing reinforcing carbon black in amounts of at least 50 parts per hundred parts of elastomer with a gaseous atmosphere containing at least about 100 parts per million ozone for a time sufficient to oxidize said surface, thus conditioning the surface for painting. The process of this invention is applicable to sulfur-cured elastomers and only those elastomers containing, in addition to the monomers recited hereinabove, carbon-black. The ethylene, propylene, nonconjugated diene elastomers containing carbon black, and preferably petroleum oil, can be contacted with a gaseous atmosphere containing 100 to 40,000 parts per million ozone for about from 30 seconds to one hour. Generally, the ozone concentration is from about 8,000 to 12,000 parts per million, and the time of treatment is from about 30 seconds to 3 minutes. Conveniently, the concentration of ozone is of the order of about 10,000 parts per million, generated by, for example, conventional electrolysis of air. A suitable paint applied to the ozone-treated surface of the ethylene, propylene, nonconjugated diene elastomer containing carbon black, and preferably petroleum oil, adheres tenaciously thereto. When a flexible resin-based paint, an acrylic resin, alkyd resin, polyester resin, polyurethane resin, or plasticized nitrocellulose lacquer resin is applied to the ozone-treated surface of the ethylene, propylene, nonconjugated diene polymer containing carbon black, it strongly adheres to the elastomeric structure. After application of the paint to the surface, the paint is cured by baking. Quite surprisingly, the degree of adhesion of the paint to the modified surface of the elastomer is so effective that an attempt to remove the paint causes tearing or scarring of the surface of the elastomer itself.

DETAILED DESCRIPTION OF THE INVENTION

The elastomers used in the present invention contain ethylene, propylene, and a nonconjugated diene as a third monomer. Representative nonconjugated dienes include those having only one polymerizable double bond such as aliphatic olefins, e.g., 1,4-hexadiene, 1,6-octadiene, 6-methyl-1,5-heptadiene; cycloaliphatic olefins, e.g., dicyclopentadiene, tricyclopentadiene, or 5-ethylidene-2-norbornene; and alkenyl-substituted norbornenes having an internal bond in the alkenyl group, e.g., 5-(2-butenyl)-2-norbornene. The preferred nonconjugated dienes are 1,4-hexadiene and 5-ethylidene-2-norbornene due to their reactivity, properties of the resulting elastomer, and availability of the dienes. These unsaturated nonconjugated diene compounds have sites on the molecule for rendering the material curable by conventional sulfur-curing techniques. Generally, the amount of ethylene, propylene, and nonconjugated diene present in the elastomer is, by weight, 30 to 75 percent ethylene, 60 to 20 percent propylene, and 0.5 to 10 percent nonconjugated diene. It is important to remember that the cured ethylene, propylene, nonconjugated diene elastomers used in the invention contain carbon black, and preferably petroleum oil, in rather large amounts. These elastomers are distinguishable from other cured ethylene, propylene, nonconjugated diene elastomers that do not contain carbon black and petroleum oil that are referred to in the rubber art as "gum stock" elastomers. Generally, as can be seen from specific working examples given hereinbelow, the ethylene, propylene, nonconjugated diene polymeric units constitute on the order of about one third of the total composition of the elastomer composition, and the carbon black and petroleum oil together usually comprise at least about 50 percent to a maximum of about 90 percent of the total composition. The finely divided carbon black, commonly used as a reinforcing agent in the rubber industry, is present in amounts of at least about 50 to 600 parts per hundred, and usually 75 to 200 parts per hundred parts of elastomer.

The petroleum oils used in the elastomeric compositions of this invention are those commonly used in the rubber industry as softeners and extenders for rubber. The amount of petroleum oil present in the copolymer is about from 10 to 100 parts per hundred parts of elastomer and usually about from 20 to 50 parts per hundred. The petroleum oils used can be highly paraffinic or highly aromatic.

Specifically preferred petroleum oils are described in detail hereinbelow in the working examples. Representative paraffinic oils used in the elastomer are identified as ASTM-D-2226, type 104-B, and aromatic oils are identified as ASTM-D-2226, type 102.

The sulfur-curable ethylene, propylene, nonconjugated diene elastomers are made by copolymerizing the monomers in an inert diluent or solvent using coordination catalyst systems such as alkyl aluminums in combination with compounds of metals of sub-groups 4–6 of the periodic table. Such procedures are known in the art and illustrated in detail in, for example, U.S. Pat. Nos. 2,933,480; 3,000,866; and 3,260,708.

The resulting elastomer is mixed with carbon black, petroleum oil, and, if desired, other curing ingredients on a two-roll mill or an internal mixer, shaped and vulcanized. Vulcanization is usually accomplished by heating the elastomer under pressure for 10–30 minutes at 160°C. or 1–3 minutes at 195°C.

The resulting cured elastomeric polymer containing petroleum oil and carbon black is then contacted with ozone. The vulcanized elastomer to be treated is placed in a container and exposed to ozone, usually in the form of a gaseous mixture, e.g., ozone-air, conveniently produced, for example, by a Welsbach generator or other suitable device. The temperature at which treatment is carried out can vary but no advantage is realized using temperatures much higher or lower than ambient temperature. The amount of ozone used in the process is at least that sufficient to modify the elastomeric surface of the structure being treated to increase the bondability of paint to the surface of the elastomer. In general, a gaseous atmosphere containing ozone, usually ozone and air, is employed in which at least 100 parts per million ozone is present. Usually about from 8,000 to 12,000 parts per million ozone is employed in the gaseous atmosphere, and conveniently about 10,000 parts per million. The length of time of ozone treatment can vary widely and, in general, the higher the concentration of ozone employed, the shorter the length of treatment time. Even at low concentrations, on the order of 100 parts per million ozone in air, 60 minutes is sufficient time in which to contact the elastomer with the gaseous ozone-contaning mixture to properly modify the surface for painting. Generally, the length of time for contact is no greater than about 10 minutes, and usually about from 1–3 minutes is sufficient, for example, when the ozone concentration is about from 8,000 to 12,000 parts per million. The surface of the elastomer treated with gaseous ozone is oxidized. This is evidenced by various analytical tests, for example, carbonyl adsorption and changes in the wetting characteristics of the surface with, for example, alcohol.

Any flexible resin-based paint can be applied to the ozone-treated surface of the cured elastomeric material preferably within 30 minutes of the ozone exposure but at least within 3 hours after the vulcanized elastomer is treated with gaseous ozone. Flexible resin-based paints that are particularly effective are those based on acrylic resins, alkyd resin, polyester resin, polyurethanes, and plasticized nitrocellulose lacquer resin paints. The film of paint applied to the surface of the ozone-conditioned article is about 1.5 to 3 mils thick when dry. The paint dries adequately in several minutes, e.g., 5 minutes, and then it can be baked to produce a smooth, hard finish on the structure. Generally, baking is done at a temperature between about 110° to 175°C. for about 15 to 45 minutes, usually at about 120°C. for about 30 minutes. Baking cures the paint, which amounts to cross-linking the paint resins into a single coherent mass.

For a further understanding of the invention the following examples are presented as illustrative of the process and are not to be considered as limiting the underlying principles of the invention.

EXAMPLES 1–4

An ethylene, propylene, 1,4-hexadiene (EPDM) elastomer containing 62 percent ethylene, 35 percent propylene, 3 percent hexadiene, and having a Mooney viscosity of 35 ML (1+4) (250°F.) or (121°C.) was used.

The elastomer composition contained:

TABLE I

| Ingredients | Weight, g. |
|---|---|
| EPDM | 220 |
| Carbon Black | 264 |
| Petroleum Oil(*) | 88 |
| Zinc Oxide | 5.5 |
| Zinc Stearate | 3.3 |
| Zinc dibutyl dithiophosphate | 2.2 |
| 2,2'-Benzothiazyl disulfide | 1.1 |
| Sulfur | 3.3 |

(*)Paraffinic oil (ASTM D-2226, Type 104B); Sp. Gr., 0.8916; Aromatics, 23.5%; Visc.(100°F.), 2907 SUS; Flash pt., 495°F.; VGC, 0.803; Aniline pt. 242°F.

The elastomeric composition was prepared on a two-roll mill at 25°C., pressed out to a slab measuring 3 inches by 6 inches and 40 mils thick and cured at 160°C. for 30 minutes. Samples were cut from the cured slab, hung in a box, and exposed to ozone-air mixtures produced by a Welsbach generator at various concentrations and for various periods of time as described in Table II.

TABLE II

| Sample No. | Ozone Conc. in Air, p.p.m. | Exposure Time, Seconds |
|---|---|---|
| 1 | 300 | 3600 |
| 2 | 10,000 | 60 |
| 3 | 10,000 | 600 |
| 4 | 10,000 | 3600 |

After the samples were exposed to ozone they were spray-painted with an alkyd-based resin paint. The painted samples were placed in an air oven at 120°C. for 20 minutes to cure the paint.

In all ozone treated samples the paint adhered to the elastomer to an extent that it could not be removed from the elastomer by peeling it back without tearing the elastomer and thus destroying the sample. The quality of paint adhesion was measured by two other tests. In the first, a cross-hatch pattern was cut into the sample with a razor blade and the surface was scraped with the razor blade in an attempt to remove the little squares in the cross-hatch pattern. The squares could not be removed without tearing the elastomer surface. In the second test, a one-eighth inch strip of the slab was cut and elongated to three times its normal length. Loosely adhering paint will lift off the elongated sample. Good adhering paint on the ozone-treated samples was observed to break into a maze of cracks, each small piece adhering to the rubber. These tests indicated that in samples made according to the present process the adhesion of the paint to the substrate was greater than the strength of the substrate. This is the maximum adhesion obtainable.

EXAMPLES 5–7

The following elastomer compositions described in Table III were compounded and cured in substantially the same manner described in Example 1, except that different EPDM rubber was used.

TABLE III

Formulation of Rubber Stocks with Oil and Carbon Black

| Ingredient | (a) Weight, g. (b) | |
|---|---|---|
| Ethylene/Propylene/5-Ethylidene-2-Norbornene | 100 | — |
| Ethylene/Propylene/1,4-Hexadiene | — | 100 |
| Carbon Black | 75 | 75 |
| Petroleum Oil (1) | 40 | 40 |
| Zinc Oxide | 5 | 5 |
| 2,2'-Benzothiazyl disulfide | 0.8 | 0.8 |
| EPTAC (2) | 1.5 | 1.5 |
| Sulfur | 1.5 | 1.5 |

(1) Sunpar 2280 - Paraffinic oil (ASTM-2226,Type 104B); Sp. Gr., 0.8916; Aromatics 23.5%; Visc. (100°F.), 2907 SUS; Flash pt., 495°F.; VGC, 0.803; Aniline pt. 242°F.
(2) EPTAC - Zinc dimethyldithiocarbamate, 50 wt. %, and tetramethylthiuram disulfide, 50 wt. %.

The elastomer samples were exposed to 2,000 parts per million ozone in air at 25°C. and then painted, as described above in Example 1. The quality of paint adhesion is given in Table IV.

TABLE IV

PAINT ADHESION TO OZONE-TREATED CURED RUBBER STOCKS CONTAINING CARBON BLACK AND OIL

| | Treatment with 2000 ppm ozone in air for indicated time and quality of adhesion | |
|---|---|---|
| | 60 seconds | 5 Minutes |
| E/P/1,4-hexadiene | Good/Excellent | Excellent |
| E/P/5-ethylidene-2-norbornene | Good | Excellent |

In all instances rated excellent the quality of adhesion of alkyd-based paint to elastomer was such that peeling back of the paint in an attempt to remove it caused tearing of the elastomer and thus the sample was destroyed.

In instances rated good very small portions of the paint would be removed without tearing the rubber.

What is claimed is:

1. A process for modifying the surface of a vulcanized elastomer to insure adequate paint adhesion thereto which comprises contacting a sulfur-cured ethylene, propylene, nonconjugated diene elastomer containing reinforcing carbon black in amounts of at least 50 parts per hundred parts of elastomer with a gaseous atmosphere containing at least about 100 parts per million ozone for a time sufficient to oxidize said surface thus conditioning the surface for painting.

2. A process of claim 1 wherein the elastomer contains about from 75 to 200 parts of carbon black per hundred parts of elastomer.

3. A process of claim 2 wherein the elastomer contains about from 10 to 100 parts of oil per hundred parts of elastomer.

4. A process of claim 3 wherein the vulcanized elastomer is contacted with a gaseous atmosphere containing about from 100 to 40,000 parts per million ozone.

5. A process of claim 4 wherein the gaseous atmosphere contains about from 8,000 to 12,000 parts per million ozone.

6. A process of claim 4 wherein the vulcanized elastomer is contacted with the gaseous atmosphere for about from 30 seconds to 1 hour.

7. A process of claim 5 wherein the vulcanized elastomer is contacted with the gaseous ozone atmosphere for about from 30 seconds to 3 minutes.

8. A process of claim 7 wherein the nonconjugated diene is 1,4-hexadiene.

9. A process of claim 7 wherein the nonconjugated diene is 5-ethylidene-2-norbornene.

10. A process of claim 3 wherein the additional subsequent steps of applying a film of flexible resin-based paint selected from the group consisting of acrylic resin, alkyd resin, polyester resin, polyurethane or plasticized nitrocellulose lacquer to the modified surface of the elastomer, and baking the surface to cure said resin paint film thereon, thereby producing an article in which paint cannot be removed therefrom without tearing the surface of the elastomer.

* * * * *